S. R. SWAIN.
PULLEY.
APPLICATION FILED JAN. 31, 1921.
1,422,389.
Patented July 11, 1922.
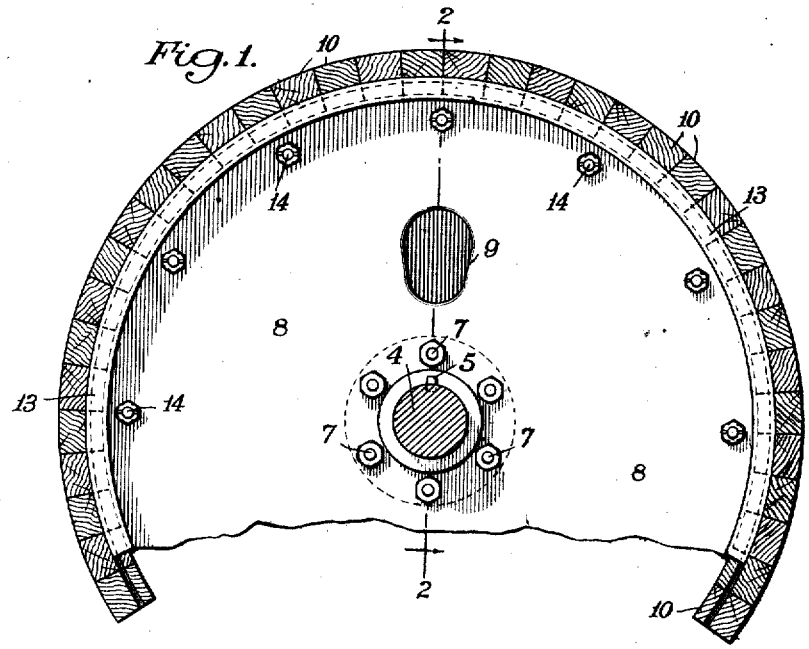
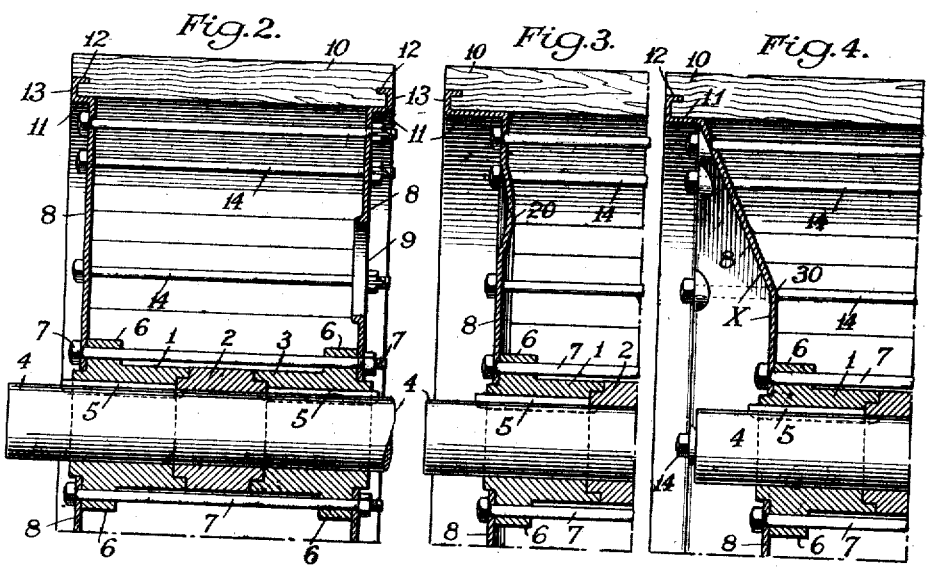
INVENTOR
Seth R. Swain
BY
Kerr, Page, Cooper & Hayward
his ATTORNEYS

UNITED STATES PATENT OFFICE.

SETH R. SWAIN, OF EAST ORANGE, NEW JERSEY.

PULLEY.

1,422,389. Specification of Letters Patent. Patented July 11, 1922.

Application filed January 31, 1921. Serial No. 441,179.

*To all whom it may concern:*

Be it known that I, SETH R. SWAIN, being a citizen of the United States, residing at East Orange, in the county of Essex and State of New Jersey, have invented certain new and useful Improvements in Pulleys, of which the following is a full, clear, and exact description.

This invention relates to pulleys adapted to transmit power and has for one of its principal objects the provision of a pulley in which mechanical and economic efficiency are combined to a high degree.

Belt or power-transmission pulleys have been constructed of iron. Such pulleys are commonly constructed as a unitary metallic casting and while they are durable and mechanically strong they are open to objection in that the belts, with which they are coupled, slip due to the metallic face of the pulley. Change of velocity ratio between driving and driven pulley results and the power transmitted is reduced. All-wood pulleys are substantially free from these objections but, as at present constructed, are of short life and when the face of a pulley of this class has become so worn as to be unfit for further use, the entire pulley is junked. Furthermore all-wood pulleys are deficient in mechanical strength. One of the objects of the present invention is to provide a pulley possessing the advantages of the pulleys of the two classes referred to above but practically free from their disadvantages. Certain other objects and advantages will be enumerated as the invention is hereinafter disclosed and others will be obvious in view of the disclosure.

Referring to the drawings in which I have illustrated some of the preferred physical embodiments which the invention may assume:

Fig. 1 is a fragmentary elevation of one form of pulley.

Fig. 2 is a half section taken on the line 2—2 of Fig. 1.

Fig. 3 is a fragmentary sectional view illustrating a modification.

Fig. 4 is a view similar to Fig. 3 but illustrating still another modification.

Referring to Figs. 1 and 2 it will be seen that the pulley comprises a hub, a face or rim, and a plurality of webs joining the hub and rim. The hub is preferably constructed of a plurality of tubular sections 1, 2 and 3 of cast iron or other suitable material. The central section 2 is in the form of a bushing adapted to interlock at its opposite ends with the adjacent ends of the end sections 1 and 3. Each end hub section is adapted to be operatively connected with the shaft 4 by means of keys 5, 5, and cooperating keyways therefor. Means are provided for drawing the hub sections into end-to-end contact with each other. One form of such means is shown as comprising an annular ring or lug 6 integral with each end section, each lug or ring 6 being provided with a series of bolt-receiving openings extending therethrough in directions parallel to the axis of the pulley, and through which holes or openings the bolts 7 are adapted to extend. Each of these bolts 7 is provided at one or both of its ends with threads adapted to cooperate with a nut. Obviously by drawing up on the nuts the sections 1, 2, 3 will be forced into and held in end-to-end contact and a strong rigid hub is the result.

The webs 8 of the pulley are preferably in the form of pressed steel discs and the means for holding the hub sections together may also be employed to connect or secure each of said webs to a corresponding end section 1 or 3 of the hub. Thus the webs 8 are shown seated against the end faces of the annular lugs 6 and provided with a series of openings which register with the openings in the said lugs 6 and through which the bolts 7 extend when the parts are assembled. If desirable the webs may be provided with one or more hand holes 9.

The rim or face of the pulley consists of a plurality of staves 10 preferably of wood whose grain runs in directions substantially parallel to the axis of the pulley. Each of these staves has a cross-section bounded by two arcs of circles, the outer arc having a radius equal to that of the pulley, and by radii of the last mentioned arc. Various means may be employed for securing the rim or face-forming staves 10 to the webs 8, 8. I prefer to clamp the staves between the webs and, in a sense, to interlock the same to prevent radial displacement of the staves due to centrifugal and other forces. One form of such connection is illustrated in Figs. 1 and 2 and may be constructed substantially as follows.

Each web 8 is formed with peripheral, annular flanges 11, 12 joined by the disc portions 13. Each of the staves 10 is provided with end grooves adapted to receive the flanges 12 as clearly shown in Fig. 2. Each web 8 is provided adjacent its periphery with an annular series of holes through which the bolts 14 extend. By drawing up on the nuts with which said bolts are provided the two webs are forced toward each other and securely clamp or grip the staves 10 between them.

It will be appreciated that when the pulley is being employed to drive or be driven by a belt there is a force, equal to the sum of the tensions in the opposite sides of the belt, exerted upon the pulley. While a slight portion of this force, which acts generally toward the shaft of the pulley, is assumed by the flanges 12, by far the greater portion is assumed by the flanges 11. Buckling or bending of the flanges 12 towards the shaft is thereby greatly minimized and practically, if not absolutely, eliminated. This is an important feature. Those staves 10 which are not in instantaneous contact with the belt exert a high centrifugal force outwardly upon the flanges 12 causing the latter to flex or bend away from the shaft. If the rim-seat provided by the flanges 11 were omitted the flexure of the flanges 12 under these two alternately acting forces would be so great as to cause the flanges 12 to rupture within a comparatively short time and the pulley would fly to pieces. It will therefore be noted that the flanges 12 not only provide a stronger, more substantial pulley but they greatly prolong the useful life of such pulleys.

The modus operandi in assembling and knocking down the pulley above described will be readily apparent to those skilled in the art in view of the foregoing description. When the parts are assembled, a rigid durable pulley having a wooden face is the result. When the staves 10 or any of them become so worn as to be unfit for further use they may readily be replaced without discarding the remainder of the pulley parts. If it is desired to provide a pulley of wider or narrower face than the specific one illustrated this may readily be accomplished by employing a longer or shorter bushing 2 and correspondingly longer or shorter staves 10, the other parts remaining the same. Or if it is desired to provide a pulley of greater or less diameter, webs 8 having greater or less diametrical dimensions may be substituted for those shown. In other words, a wide selection of different sized pulleys is afforded from a comparatively small number of stock parts.

The invention is of course susceptible to modification in various respects. One modification is shown in Fig. 3 in which the web 8 is provided with an annular strengthening rib or corrugation 20. Furthermore instead of varying the length of the bushings 2, in varying the width of the pulley face, webs having longer flanges 11' (or shorter if desired) to accommodate the longer (or shorter) staves may be employed. Or the same result may be achieved by the employment of webs 8 bent as at 30 in Fig. 4. By properly selecting from webs 8 having different angles X the same hub may be employed for pulleys having longer or shorter staves 10 and consequently a wider or narrower face.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relation described, some of these may be altered, others omitted and some of the features of each modification embodied in the others without interfering with the more general results outlined and the invention extends to such use.

What I claim is:—

1. A pulley comprising in combination, a hub consisting of a plurality of tubular sections, means for holding said sections in end-to-end contact with each other, a plurality of peripherally spaced webs each connected to a corresponding one of said sections, a plurality of face-forming staves extending between said webs, and means for drawing said webs toward each other to cause them to clamp said staves.

2. A pulley comprising in combination, a hub consisting of a plurality of metallic tubular sections, means for holding said sections in end-to-end contact with each other, a plurality of peripherally spaced metallic webs each connected to a corresponding one of said sections, a plurality of face-forming wooden staves extending between said webs, and means for drawing said webs toward each other to cause them to clamp said staves.

3. A pulley comprising in combination, a hub consisting of a plurality of metallic tubular sections, a plurality of peripherally spaced sheet metal webs each adapted to be connected to a corresponding one of said sections, means connecting said webs to their corresponding sections and holding said sections in end-to-end contact with each other, a plurality of face-forming wooden staves extending between said webs and whose grain runs in a direction substantially parallel to the pulley axis, and means for drawing said webs toward each other to cause them to clamp said staves.

4. A pulley comprising in combination, a hub consisting of a plurality of tubular sections, means for holding said sections in end-to-end contact with each other, a plurality of axially spaced webs each connected to a corresponding one of said sections, and rim-forming means carried by said webs in radially spaced relationship with respect to said hub.

5. A belt pulley comprising in combination, hub, a multi-section wooden rim, and means comprising a plurality of webs connecting said hub and rim, said webs being each provided with a plurality of flanges, certain of the flanges of said webs engaging said rim to constrain the latter against radial outward movement and certain others of said flanges being in the shape of a cylinder coaxial with the pulley and engaging said rim to constrain the latter against radial inward movement.

6. A belt pulley comprising in combination, a hub, a plurality of webs connected to said hub and each provided with a laterally extending peripheral flange, a plurality of face-forming staves grooved at their ends to receive said flanges and extending between said webs, means for holding said webs toward each other to cause them to clamp said staves, and means, comprising additional cylindrical flanges provided on said webs and coaxial with the pulley, for engaging said staves to constrain the latter against inward radial movement.

In testimony whereof I have hereto affixed my signature.

SETH R. SWAIN.